US012238392B2

(12) United States Patent
Simmons et al.

(10) Patent No.: US 12,238,392 B2
(45) Date of Patent: Feb. 25, 2025

(54) COMPUTING SYSTEM WITH DEVICE ATTESTATION FEATURE (71) Applicant: Roku, Inc., San Jose, CA (US)

(72) Inventors: Willard Lennox Simmons, Boston, MA (US); Atanas Hristov Banov, Menlo Park, CA (US); Douglas Corey Reher, Mountain View, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/676,058

(22) Filed: Feb. 18, 2022

(65) Prior Publication Data

US 2023/0247268 A1    Aug. 3, 2023

Related U.S. Application Data (60) Provisional application No. 63/267,363, filed on Jan. 31, 2022.

(51) Int. Cl.
H04N 21/8358 (2011.01)
H04L 9/08 (2006.01)
H04L 9/32 (2006.01)
H04N 21/81 (2011.01)

(52) U.S. Cl.
CPC ....... H04N 21/8358 (2013.01); H04L 9/0822 (2013.01); H04L 9/3236 (2013.01); H04N 21/812 (2013.01)

(58) Field of Classification Search
CPC ............. H04N 21/8358; H04N 21/812; H04N 21/835; H04L 9/0822; H04L 9/0819; H04L 9/3236; H04L 9/006; G06F 16/78; G06F 21/64; G06F 21/645
See application file for complete search history.

(56) References Cited

U.S. PATENT DOCUMENTS

| 2017/0032413 | A1* | 2/2017 | McCartney | ............... H04L 9/14 |
| 2018/0375664 | A1* | 12/2018 | Maxwell | ............... H04L 63/126 |
| 2019/0312734 | A1* | 10/2019 | Wentz | ................... H04L 9/3239 |

(Continued)

FOREIGN PATENT DOCUMENTS

| WO | 2015013412 A1 | 1/2015 |
| WO | 2022010548 A1 | 1/2022 |

OTHER PUBLICATIONS

"SafetyNet Attestation API," Android Developers, last updated Nov. 22, 2021, available at https://developer.android.com/training/safetynet/attestation.

Primary Examiner — Olugbenga O Idowu
(74) Attorney, Agent, or Firm — McDonnell Boehnen Hulbert & Berghoff LLP (57) ABSTRACT In one aspect, an example method includes (i) encountering, by a media player of a media presentation system, a trigger to transmit a network communication to a computing device; (ii) generating, by the media player, an attestation watermark indicative of an authenticity of the media player using a cryptographic key; (iii) attaching, by the media player, the attestation watermark to the network communication; and (iv) based on encountering the trigger, transmitting, by the media player, the network communication having the attached attestation watermark to the computing device, the authenticity of the media player being verifiable by the computing device using the attestation watermark.

16 Claims, 5 Drawing Sheets (56) References Cited

U.S. PATENT DOCUMENTS

2020/0145728 A1     5/2020   Przemyslaw
2021/0021407 A1*   1/2021   Weerasinghe ........ H04L 9/3239
2022/0417034 A1*   12/2022   Wang ...................... G06F 21/44

* cited by examiner

COMPUTING SYSTEM WITH DEVICE ATTESTATION FEATURE

CROSS-REFERENCE TO RELATED APPLICATIONS

This disclosure claims priority to U.S. Provisional Pat. App. No. 63/267,363 filed Jan. 31, 2022, which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

BACKGROUND

A typical media presentation system operates to facilitate presentation of media content, such as video, audio, or multi-media content, to end users. An example of such a system could include client-side equipment positioned at customer premises and arranged to output and present media content on a user interface such as a display screen with an associated sound system, and server-side equipment arranged to serve media content to the client-side equipment for presentation.

By way of example, the client-side equipment could include a media presentation device such as a television (TV), monitor, tablet computer, or mobile phone, which could present the media content on a user interface. Further, the client-side equipment could include a media player such as an over-the-top (OTT) streaming media player, cable or satellite set top box, digital video recorder, disc player, gaming system, mobile phone, personal computer, audio/video receiver, or tuner, which could be integrated with or in local or network communication with the media presentation device and could output media content to the media presentation device for presentation on the user interface. And the server-side equipment could include a media server and/or head-end equipment, operated by an OTT provider (e.g., virtual multichannel video programming distributor (virtual MVPD)), cable or satellite TV provider, or the like, which could stream or otherwise deliver media content to the client-side equipment for presentation.

In operation, a user at the customer premises may control the client-side equipment, to cause the system to present a desired media-content item, such as a movie, TV show, or video game, among other possibilities, any of which might be locally-stored, broadcast, or on-demand, also among other possibilities. For instance, the media presentation system may present the user with an on-screen media-content selection menu, and the user may operate a remote control to navigate through that menu, to select a desired media-content item, and to direct the system to present the selected media-content item. In response, possibly through interaction between the client-side equipment and the server-side equipment, the client-side equipment could obtain and present the selected media-content item to the user. And the user may then enjoy presentation of that selected media-content item.

SUMMARY

In one aspect, an example method is disclosed. The method includes (i) encountering, by a media player of a media presentation system, a trigger to transmit a network communication to a computing device; (ii) generating, by the media player, an attestation watermark indicative of an authenticity of the media player using a cryptographic key; (iii) attaching, by the media player, the attestation watermark to the network communication; and (iv) based on encountering the trigger, transmitting, by the media player, the network communication having the attached attestation watermark to the computing device, the authenticity of the media player being verifiable by the computing device using the attestation watermark.

In another aspect, an example non-transitory computer-readable medium is disclosed. The computer-readable medium has stored thereon program instructions that upon execution by a processor, cause performance of a set of acts including (i) encountering a trigger to transmit a network communication from a media player of a media presentation system to a computing device; (ii) generating an attestation watermark indicative of an authenticity of the media player using a cryptographic key; (iii) attaching the attestation watermark to the network communication; and (iv) based on encountering the trigger, transmitting the network communication having the attached attestation watermark to the computing device, the authenticity of the media player being verifiable by the computing device using the attestation watermark.

In another aspect, an example media player is disclosed. The computing system is configured for performing a set of acts including (i) encountering a trigger to transmit a network communication to a computing device; (ii) generating an attestation watermark indicative of an authenticity of the media player using a cryptographic key; (iii) attaching the attestation watermark to the network communication; and (iv) based on encountering the trigger, transmitting the network communication having the attached attestation watermark to the computing device, the authenticity of the media player being verifiable by the computing device using the attestation watermark.

DETAILED DESCRIPTION

I. Overview

Spoofing is a common fraud threat in the OTT space. As one example of spoofing, a bad actor can fabricate an advertisement request by using an emulator or some other spoofing device to send an advertisement request to an advertisement publisher. Even though the advertisement request does not originate from a genuine media player, to the advertisement publisher, the advertisement request may appear to be a genuine advertisement request from a media player. As another example of spoofing, a bad actor can fabricate an impression by sending a network communication to a measurement platform. Even though the impression does not originate from a genuine media player, to the measurement platform, the impression may appear to be a genuine impression. With current solutions, it is difficult for advertisement publishers, measurement platforms, and other parties to verify whether network traffic that claims to be from a particular device platform actually originates from a real device as opposed to originating from a spoofing device.

Disclosed herein are methods and systems to address these and potentially other issues. In an example method, a media player of a media presentation system encounters a trigger to transmit a network communication to a computing device, such as a computing device of an advertisement publisher or a measurement platform. The media player generates an attestation watermark indicative of an authenticity of the media player using a cryptographic key, and attaches the attestation watermark to the network communication. Based on encountering the trigger, the media player transmits the network communication having the attached attestation watermark to the computing device. The authenticity of the media player is verifiable by the computing device using the attestation watermark.

As such, the method provides a deterministic, countermeasure for spoofing that allows outside parties to detect and reject fraudulent network traffic (e.g., advertisement requests, impression beacons, etc.) that does not originate from an authentic media player. In some examples, an advertisement publisher can increase the value of advertisement inventory by using the method to reject fraudulent advertisement requests. Similarly, a measurement platform can provide more accurate measurements of media impressions by using the method to reject fraudulent impressions.

II. Example Architecture

A. Media Presentation System

Figure 1:
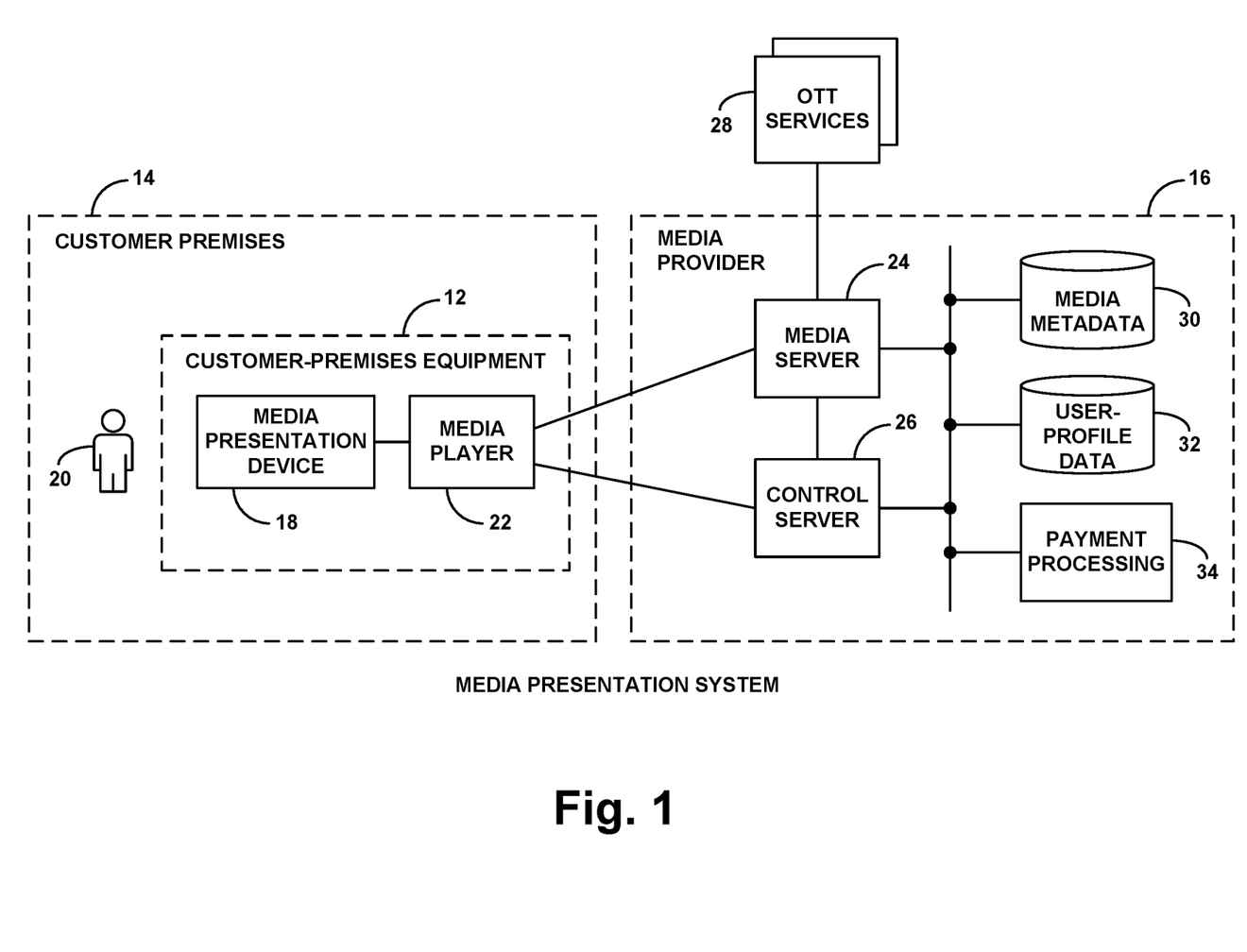
FIG. 1 is a simplified block diagram of an example media presentation system.

FIG. 1 is a simplified block diagram of an example media presentation system. FIG. 1 is a simplified block diagram of an example media presentation system. In line with the discussion above, the example media presentation system includes customer-premises equipment 12 located at customer premises 14 such as a home, and a network based media provider 16 configured to provide the customer-premises equipment 12 with media content for presentation.

In the example arrangement, the customer-premises equipment 12 includes a media presentation device 18 such as a TV or other user-interface device configured to present media content to one or more users such as example user 20. Further, the customer-premises equipment 12 includes a media player 22, such as an OTT device, configured to receive streaming media content and to provide the media content to the media presentation device 18 for presentation. In various implementations, the media player 22 could be provided as a standalone device connected with the media presentation device 18 by a High Definition Multimedia Interface (HDMI) cable or other wired or wireless connection or could be integrated within the media presentation device 18 or provided in another manner.

The example network-based media provider 16 then includes a media server 24 configured to stream media content to user devices such as customer-premises equipment 12 and includes a control server 26 configured to control the streaming. The media provider 16 could be configured to obtain much of this content on demand from various OTT services 28 and to serve or proxy that media content to the customer-premises equipment for presentation.

In an example implementation, the media player 22 could be in network communication with both the media server 24 and control server 26, to facilitate interacting with the media provider 16 to receive information about available media content, and to request and receive streaming media content for presentation on media presentation device 18. For instance, the media player 22 could have local area network (LAN) connectivity at the customer premises 14, the customer premises 14 could have a router and modem (not shown) with an assigned public Internet Protocol (IP) address on the Internet, and the media server 24 and control server 26 could be accessible at respective public IP addresses as well. Alternatively, the media player 22 could have virtual private network (VPN) connectivity with the media server 24 and control server 26, among other possibilities.

Streaming of media content from the media server 24 to the media player 22 could operate according to any of a variety of well-known adaptive bit-rate streaming protocols, such as Dynamic Adaptive Streaming over Hypertext Transfer Protocol (HTTP) (DASH), HTTP Live Streaming (HLS), or Smooth Streaming Transport Protocol (SSTP), among other possibilities. As the details of these streaming protocols are known, they will not be described here.

In the example implementation, the media provider 16 could include or otherwise have access to various data and platforms to facilitate providing streaming media services to users such as user 20. As shown, for instance, the media provider 16 could have access to media metadata 30, user profile data 32, and a payment processing system 34. The media metadata 30 could include a variety of information regarding each of various media-content items available for streaming, such title, duration, genre, production staff, menu graphics, and ratings, among other possibilities. The user profile data 32 could include profile records for users and associated customer-premises equipment configured to receive streaming media service provided by the media provider 16, such as user name, equipment location, user-payment information (e.g., credit card information), and mobile phone number if applicable. And the payment processing system 34 could be configured to securely interact with a commercial payment processing platform (e.g., a credit-card service) (not shown) and with a user such as user 20, to enable the media provider 16 to process user payments for media streaming and/or other services.

As noted above, the media presentation system could be configured to present the user 20 with an on-screen media-content selection menu, and the user could operate a remote control (not shown) to navigate through that menu and interact with various on-screen prompts in order to select a desired media-content item to be presented and to direct the system to present that selected item. In practice, for instance, the control server 26 could serve the media player 22 with graphical user interfaces (GUIs) representing various menu screens and prompts, and the media player 22 could responsively output the GUIs for presentation by the media presentation device 18. The control server 26 could establish these GUIs based on the media metadata 30 and user profile data 32, such as restricting the GUIs to present information about media content that is available for streaming to the user 20. And the control server 26 could receive user input entered into media player 22 and could respond to the user input by generating and transmitting other GUIs to the media player 22 for presentation.

B. Customer-Premises Equipment

Figure 2:
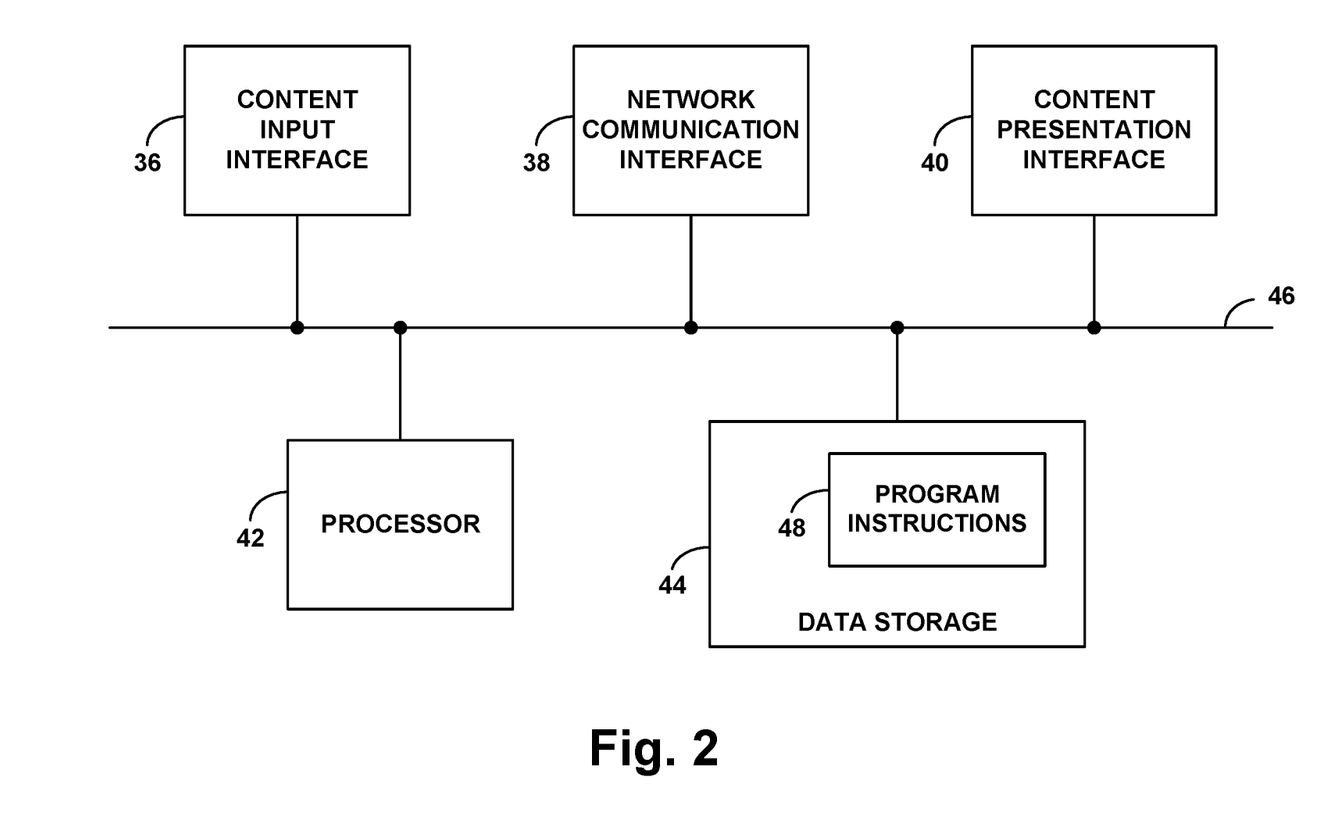
FIG. 2 is a simplified block diagram of example customer-premises equipment.

FIG. 2 is a simplified block diagram of example customer-premises equipment, including aspects of a media player and media presentation device as discussed above. As shown in FIG. 2, the example customer-premises equipment includes a content input interface 36, a network communication interface 38, a content presentation interface 40, a processor 42, and non-transitory data storage 44, any or all of which could be integrated together or, as shown, communicatively linked together by a system bus, network, or other connection mechanism 46.

Content input interface 36 could comprise a physical communication interface for receiving media content to be presented by the customer-premises equipment. As such, the content input interface 36 could include one or more wired and/or wireless interfaces for establishing communication with and receiving media content in analog or digital form from a media source. Network communication interface 38, which could be separate from or the same interface as the content input interface 36, could comprise a physical network connection mechanism to facilitate communication on a network, and/or for engaging in direct or networked communication with one or more other local or remote entities. These interfaces could comprise a wireless or wired Ethernet interface or other type of network interface, for engaging in IP communication and/or other type of network communication, among other possibilities.

Content presentation interface 40 could then comprise one or more components to facilitate presentation of the received media content. By way of example, the content presentation interface 40 could comprise a user interface such as a display screen and/or a loudspeaker, as well as one or more drivers or other components for processing the received media content to facilitate presentation of the content on the user interface.

Processor 42 could then comprise one or more general purpose processors (e.g., microprocessors) and/or one or more specialized processors (e.g., application specific integrated circuits). And non-transitory data storage 44 could comprise one or more volatile and/or non-volatile storage components, such as optical, magnetic, or flash storage. Further, as shown, non-transitory data storage 44 could store stores program instructions 48, which could be executable by processor 42 to carry out various operations described here.

C. Device Attestation System

Figure 3:
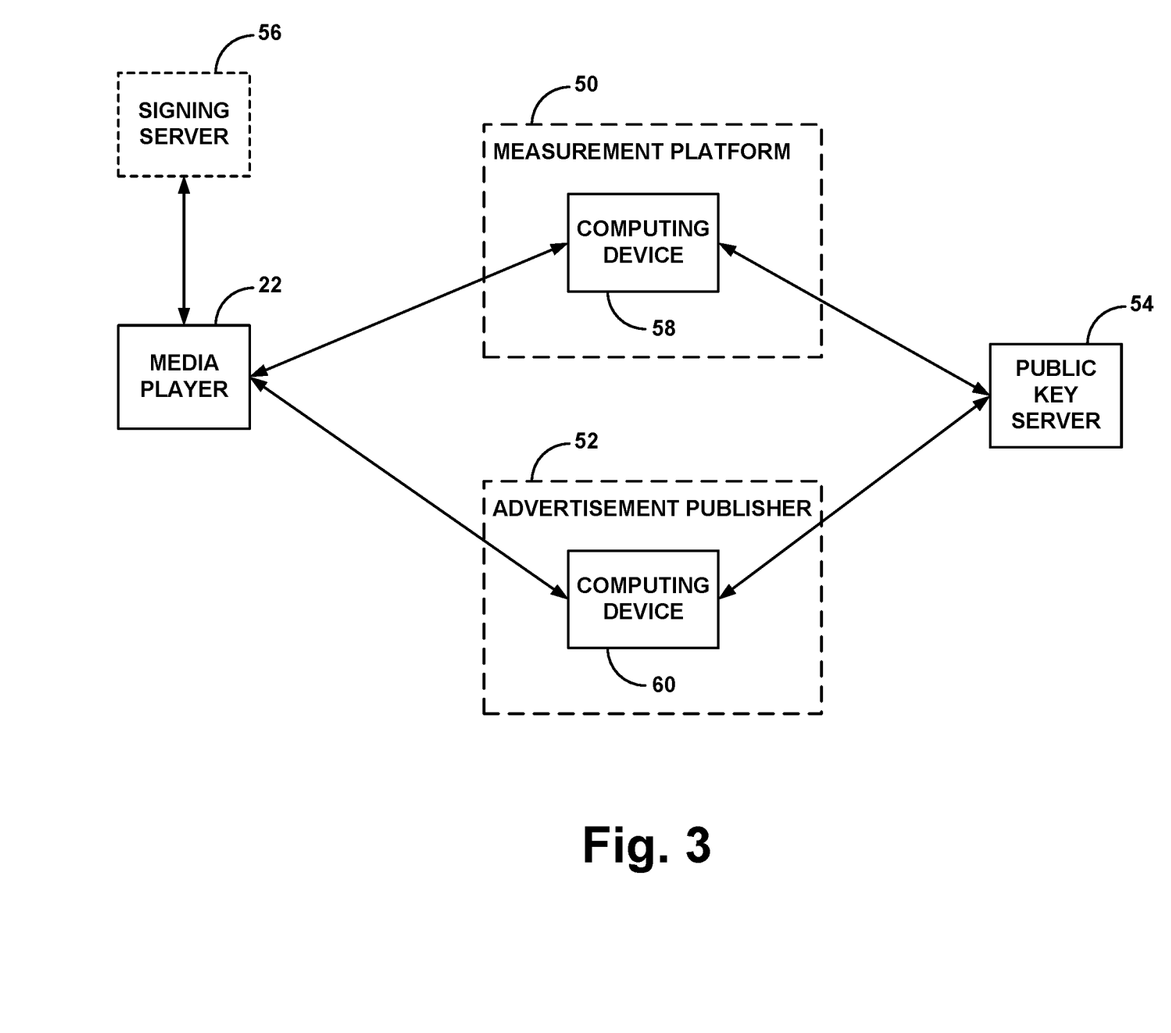
FIG. 3 is a simplified block diagram of an example device attestation system.

FIG. 3 is a simplified block diagram of an example device attestation system. As shown in FIG. 3, the device attestation system includes media player 22, a measurement platform 50, an advertisement publisher 52, a public key server 54, and a signing server 56. Measurement platform 50, in turn, includes a computing device 58. Similarly, advertisement publisher 52 includes a computing device 60. Each of public key server 54, signing server 56, computing device 58, and computing device 60 can include a processor, data storage unit, communication interface, and user interface.

Measurement platform 50 can be configured to measure (e.g., count) advertisement impressions using impression beacons. Impression beacons are notifications sent to computing device 58 indicating that an advertisement has been presented. One example of an impression beacon is a Hypertext Transfer Protocol (HTTP) request. In some instances, a tracking module implemented by media player 22 can transmit impression beacons to computing device 58 when trigger conditions are satisfied. For example, media player 22 can transmit an impression beacon when a first frame of a video advertisement is displayed. Additionally or alternatively, media player 22 can transmit impression beacons at specific increments throughout a duration of a video advertisement, such that measurement platform 50 can track how long media player 22 presents the video advertisement.

Advertisement publisher 52 can be a platform of an entity providing advertisement inventory. In some instances, advertisement publisher 52 can be an operator of an individual streaming channel. Alternatively, advertisement publisher can be an operator of a family of affiliated streaming channels. Media player 22 can communicate with computing device 60 of advertisement publisher 52 to request advertisements.

Media player 22 can include a client-side library that provides advertisement related features for media player 22. For instance, media player 22 can include a client-side library that provides advertisement related features for an advertisement-supported video-on-demand (AVOD) service. The advertisement related features can include sending advertisement requests to advertisement publishers, such as advertisement publisher 52. The advertisement related features can also include sending impression beacons to measurement platforms, such as measurement platform 50.

In addition, in line with the discussion above, media player 22 can be configured to generate an attestation watermark, attach the attestation watermark to a network communication, and transmit the attestation watermark to either computing device 58 of measurement platform 50 or computing device 60 of advertisement publisher 52. In some examples, media player 22 generates an attestation watermark by generating a data object specifying a claim related to media player 22, and cryptographically signing the data object using a cryptographic key stored by media player 22. In other words, media player 22 can cryptographically sign the data object without communicating with signing server 56. Hence, signing server 56 is an optional component that can be omitted from the device attestation system.

A claim is a piece of data that is asserted about media player 22. For instance, a claim can include a device identifier (e.g., an advertising identifier) of media player 22, a timestamp indicative of a current time, a channel identifier of a channel that media player 22 is streaming content on, or a user agent string identifying a device and/or operating system version of media player 22. Other examples of claims include an HDMI identifier identifying whether HDMI is on, a sound identifier identifying whether sound is on, a content identifier, a content genre, a user ID identifying a user ID of a logged-in user, and a last user control interaction time.

In some examples, the cryptographic key is a private key that is part of a private key/public key pair. The private key can be stored in a file system of the client-side library of media player 22 and might only be accessible to the client-side library.

Public key server 54 can store the public key of the private key/public key pair. In some examples, media player 22 or another computing device supplies a base URL to measurement platform 50 and advertisement publisher 52 during integration. The base URL identifies public key server 54, so that computing device 58 and computing device 60 can retrieve the public key from public key server 54.

In some examples, media player 22 can generate attestation watermark by sending an attestation request to signing server 56. Based on receiving the attestation request, signing server 56 can generate an attestation watermark. For instance, signing server 56 can generate a data object specifying a claim related to media player 22, and cryptographically sign the data object using a cryptographic key stored by signing server 56.

In some examples, the private key used for signing the data object is a rotating private key. For instance, an operator of the device attestation system can periodically send a new private key to media player 22 and/or signing server 56. In conjunction with updating the private key, the operator can add a public key to public key server 54. Public key server 54 can host multiple public keys, with each public key having a corresponding identifier. Further, prior to or after generating an attestation watermark, media player 22 can send a public key identifier to computing device 58 or computing device 60. In some instances, the public key identifier is part of the attestation watermark. Computing device 58 or computing device 60 can use the public key identifier to select and download an appropriate public key from public key server 54.

III. Example Operations

The device attestation system of FIG. 3 and/or components thereof can perform various acts and/or functions. Examples of these and related features will now be described.

A. Generating an Attestation Watermark

In line with the discussion above, while providing advertisement related features, a media player can encounter a trigger to transmit a network communication to a computing device. As one example, the media player can encounter a trigger to transmit an impression beacon to a measurement platform. As another example, the media player can encounter a trigger to transmit an advertisement request to an advertisement publisher. Based on encountering the trigger, the media player (or a signing server) can generate an attestation watermark, and attach the attestation watermark to a network communication. The act of generating the attestation watermark can involve generating a data object specifying a claim related to the media player, and cryptographically signing the data object using a cryptographic key.

Figure 4:
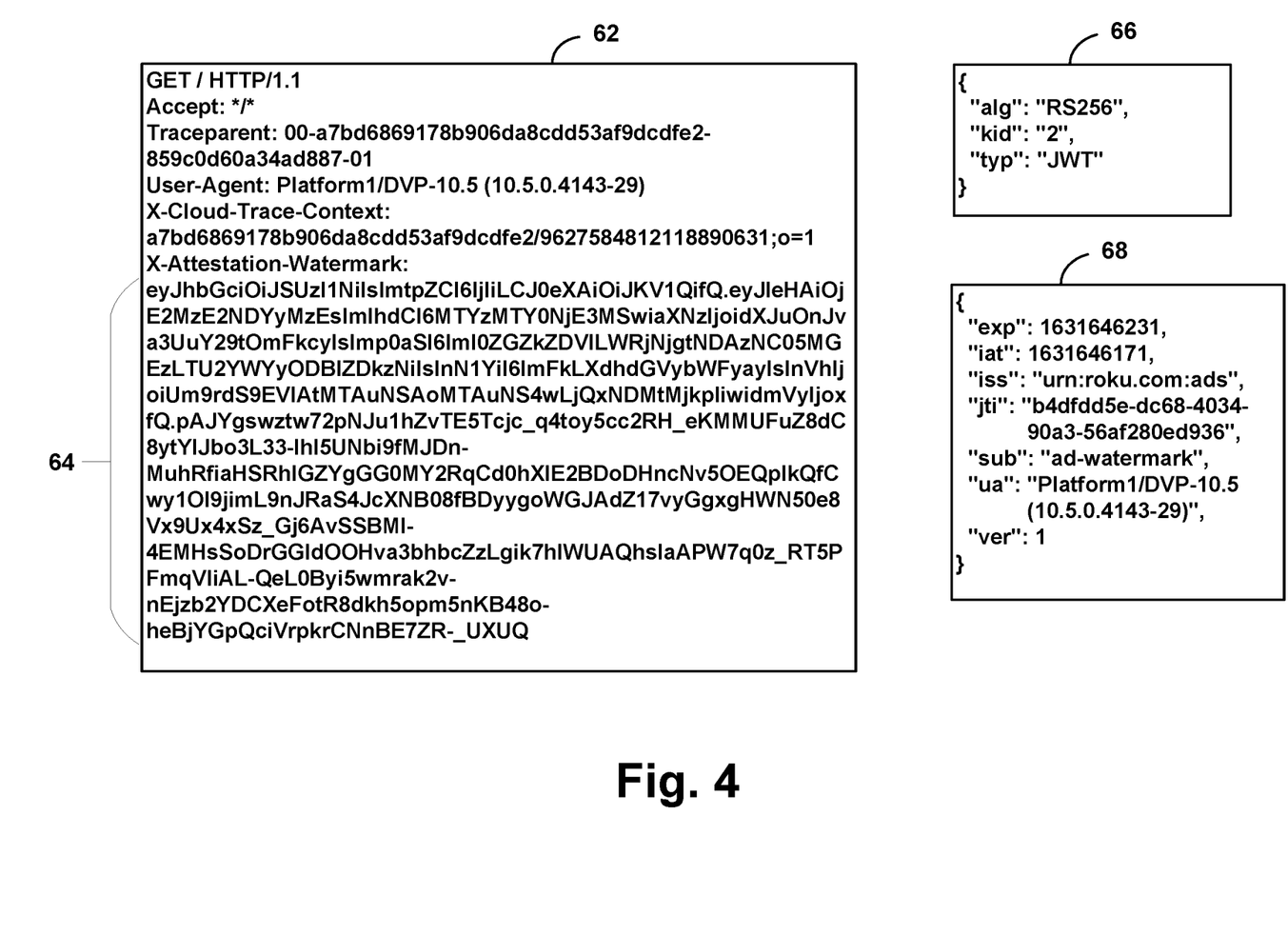
FIG. 4 is a conceptual illustration of an example network communication including an attestation watermark.

FIG. 4 is a conceptual illustration of an example network communication 62 including an attestation watermark 64. As shown in FIG. 4, network communication 62 is an HTTP request. The HTTP request can be an impression beacon or an advertisement request.

In FIG. 4, attestation watermark 64 is shown as a JavaScript Object Notation (JSON) Web Token (JWT) included within a header of the HTTP request. The JWT includes three parts separated by dots: a header, a payload, and a signature. The header and the payload are Base64Url encoded. For purposes of explanation, FIG. 4 shows a decoding 66 of the header and a decoding 68 of the payload.

In this example, the header specifies values for three parameters: the signing algorithm, the key identifier, and the type of token. For this example, the signing algorithm is RS256, the key identifier is two, and the type of token is JWT. The key identifier is an identifier of a public key that is usable to verify the signature of the JWT. A computing device, such a media player or a signing server, can generate the header by specifying values for the signing algorithm and the key identifier.

Further, in this example, the payload specifies values for various claims, namely, expiration time (exp) after which the JWT must be rejected, issuance time (iat) representing creation time, issuer of the token (iss), JWT unique id (jti), subject (sub), user agent (ua), and a claim schema version (ver). The JWT unique id can be a globally unique identifier.

In other examples, the payload can specify values for one or more other claims, such as a channel identifier and/or a device identifier. Other examples of claims (not shown) include an HDMI identifier identifying whether HDMI is on, a sound identifier identifying whether sound is on, a content identifier, a content genre, a user ID identifying a user ID of a logged-in user, and a last user control interaction time. A computing device, such as the media player or the signing server, can generate the header by specifying values for the various claims.

A computing device, such as a media player or a signing server, can determine the signature of the JWT using the encoded header, the encoded payload, and the signing algorithm, and a private key of a private key/public key pair.

In some examples, the media player includes the attestation watermark in the network communication if the network communication is intended for a domain that is within a whitelist of acceptable domains. Accordingly, based on encountering the trigger to transmit the network communication, the media player can determine whether a destination of the network communication is within a whitelist of acceptable domains. Based on determining that the destination is within the whitelist, the media player can generate an attestation watermark and attach the attestation watermark to the network communication. Whereas, based on determining that the destination is not within the whitelist, the media player can forgo generating the attestation watermark.

Alternatively, the media player can include the attestation watermark in the network communication if the network communication is not intended for a domain that is within a blacklist of unacceptable domains. Accordingly, based on encountering the trigger to transmit the network communication, the media player can determine whether a destination of the network communication is within a blacklist of unacceptable domains. Based on determining that the destination is not within the blacklist, the media player can generate an attestation watermark and attach the attestation watermark to the network communication. Whereas, based on determining that the destination is within the blacklist, the media player can forgo generating the attestation watermark.

In some examples, the media player can cache attestation watermarks for a period of time until the attestation watermarks expire. Further, based on encountering a trigger to transmit a network communication, the media player can determine whether a cached attestation watermark is available for attaching to the network communication. Based on determining that a cached attestation watermark is available, the media player can retrieve the cached attestation watermark from a data storage unit of the media player, and attach the cached attestation watermark to the network communication. In a similar manner, the signing server can cache attestation watermarks. Caching attestation watermarks allows attestation watermarks to be reused for multiple impression beacons and/or advertisement requests, thereby reducing the processing load associated with generating attestation watermarks.

B. Interpreting an Attestation Watermark

In line with the discussion above, a media player can transmit a network communication including an attestation watermark to a computing device of another party, such as a measurement platform or an advertisement publisher. The computing device of the other party can then use the attestation watermark to verify an authenticity of the media player.

By way of example, the attestation watermark can be a JWT that is signed with a private key. With this approach, the computing device can decode the header to identify the signing algorithm and the public key. Further, the computing device can decode the payload to identify the values for one or more claims.

Still further, because the JWT is signed with a private key, the computing device can use the public key to verify that the network communication was sent by a holder of the private key. For instance, the computing device can verify the signature of the JWT by retrieving the public key, and determining a signature using the encoded header, the encoded payload, the public key, and the signing algorithm. Based on determining that the signature determined using the public key matches the signature in the JWT, the computing device can determine that the network communication was sent by a holder of the private key. Assuming that the private key is only known to authentic media players, the computing device can therefore use the public key to verify that the network communication was sent by a genuine, authentic media player.

In some examples, after retrieving a public key from a public key server, the computing device can cache the public key for a period of time. This can reduce unnecessary network traffic and increase performance (e.g. interpretation speed of attestation watermarks).

In some examples, the computing device can use the result of the signature verification as one of a plurality of signals for detecting fraudulent network traffic. By way of example, if a signature determined using a public key does not match a signature within an attestation watermark, the computing device can flag the network communication including the attestation watermark as suspicious. Similarly, if the value of an issuer claim and/or the value of a subject claim are different than the expected values for those claims, the computing device can flag the network communication as suspicious. Likewise, if a difference between a timestamp of when the network communication is received and the value of the issuance time claim is more than a threshold duration (e.g. half a second, two seconds, etc.), the computing device can flag the network communication as suspicious. As another example, if the value of the user agent claim does not match a user agent specified in the header of the network communication, the computing device can flag the network communication as suspicious. The computing device can then log any network communications flagged as suspicious within a report, for further analysis by an operator.

C. Example Method

Figure 5:
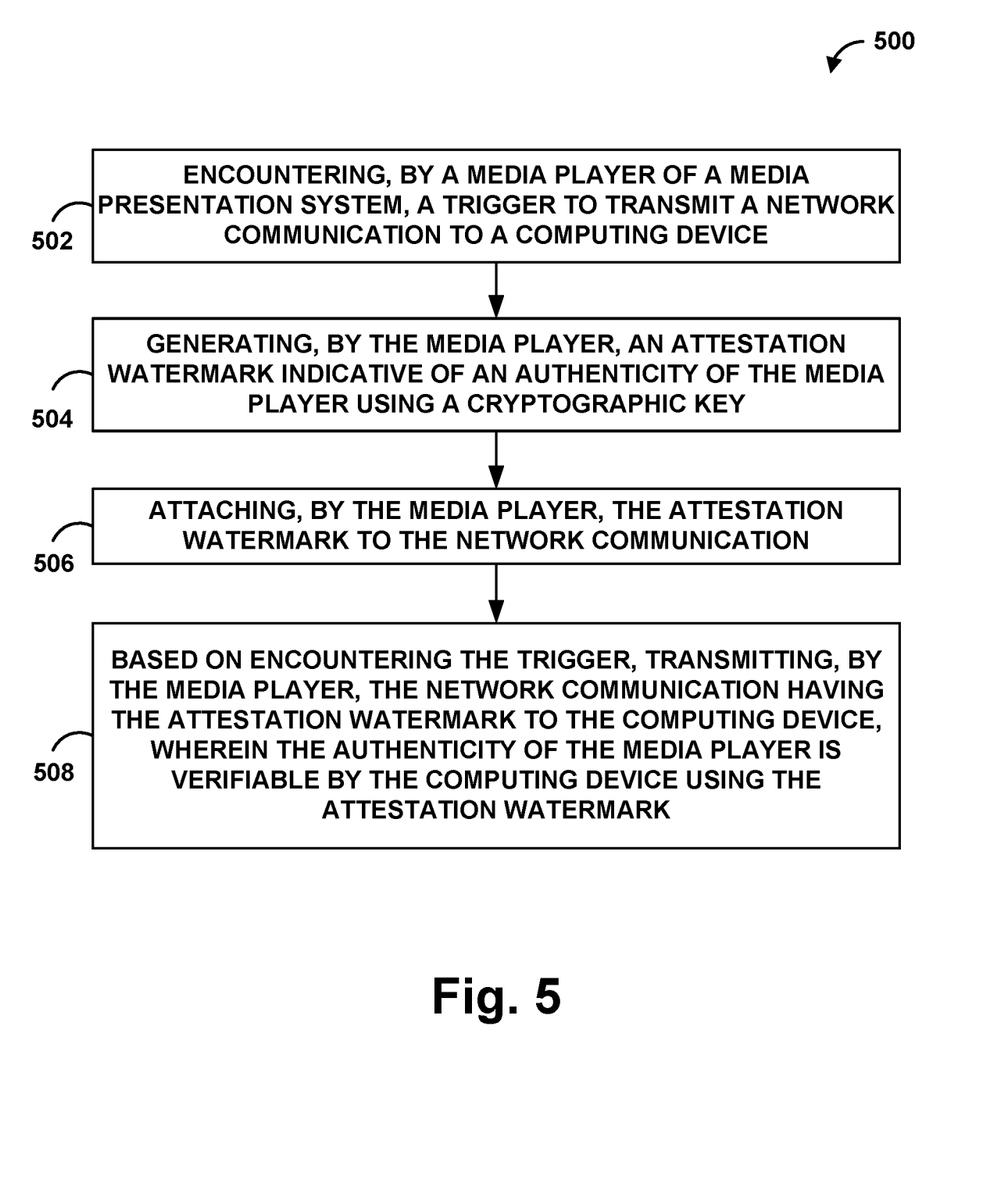
FIG. 5 is a flow chart of an example method.

FIG. 5 is a flow chart illustrating an example method 500. At block 502, the method 500 can include encountering, by a media player of a media presentation system, a trigger to transmit a network communication to a computing device. At block 504, the method 500 can include generating, by the media player, an attestation watermark indicative of an authenticity of the media player using a cryptographic key. At block 506, the method 500 can include attaching, by the media player, the attestation watermark to the network communication. And at block 508, the method 500 includes, based on encountering the trigger, transmitting, by the media player, the network communication having the attached attestation watermark to the computing device. The authenticity of the media player is verifiable by the computing device using the attestation watermark.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
   encountering, by a media player of a media presentation system, a trigger to transmit an advertisement request to a computing device associated with a media provider;
   responsive to encountering the trigger to transmit the advertisement request and before a transmission of the advertisement request to the computing device, generating, by the media player, an attestation watermark indicative of an authenticity of the media player using a cryptographic key, wherein the cryptographic key is stored by the media player, and wherein generating the attestation watermark comprises: (i) generating a data object specifying a claim related to the media player, wherein the specified claim comprises a timestamp indicative of an expiration time of the attestation watermark; and (ii) cryptographically signing the data object using the cryptographic key, and wherein the specified claim comprises a device identifier of the media player;
   attaching, by the media player, the attestation watermark to the advertisement request; and
   based on encountering the trigger, transmitting, by the media player, the advertisement request having the attached attestation watermark to the computing device, wherein the authenticity of the media player is verifiable by the computing device using the attestation watermark.

2. The method of claim 1, wherein the specified claim comprises a timestamp indicative of a creation time of the attestation watermark.

3. The method of claim 1, wherein generating the attestation watermark comprises generating a JavaScript Object Notation (JSON) Web Token (JWT) including the specified claim using the cryptographic key.

4. The method of claim 3, wherein a signature of the JWT is verifiable by the computing device using a public key.

5. The method of claim 4, wherein:

the public key is hosted on a server, and the JWT identifies the public key.

6. The method of claim 1, wherein the computing device associated with the media provider is a media server.

7. The method of claim 1, wherein the computing device associated with the media provider is a computing device of an advertisement publisher.

8. The method of claim 1, wherein generating the attestation watermark comprises:

sending, by the media player, an attestation request to a server that stores the cryptographic key; and receiving, by the media player from the server, the attestation watermark.

9. A non-transitory computer-readable medium having stored thereon program instructions that upon execution by a processor, cause performance of a set of acts comprising:

encountering a trigger to transmit an advertisement request from a media player of a media presentation system to a computing device associated with a media provider;

responsive to encountering the trigger to transmit the advertisement request and before a transmission of the advertisement request to the computing device, generating an attestation watermark indicative of an authenticity of the media player using a cryptographic key, wherein the cryptographic key is stored by the media player, and wherein generating the attestation watermark comprises: (i) generating a data object specifying a claim related to the media player, wherein the specified claim comprises a timestamp indicative of an expiration time of the attestation watermark; and (ii) cryptographically signing the data object using the cryptographic key, and wherein the specified claim comprises a device identifier of the media player;

attaching the attestation watermark to the advertisement request; and based on encountering the trigger, transmitting the advertisement request having the attached attestation watermark to the computing device, wherein the authenticity of the media player is verifiable by the computing device using the attestation watermark.

10. A media player configured for performing a set of acts comprising:

encountering a trigger to transmit an advertisement request to a computing device associated with a media provider;

responsive to encountering the trigger to transmit the advertisement request and before a transmission of the advertisement request to the computing device, generating an attestation watermark indicative of an authenticity of the media player using a cryptographic key, wherein the cryptographic key is stored by the media player, and wherein generating the attestation watermark comprises: (i) generating a data object specifying a claim related to the media player, wherein the specified claim comprises a timestamp indicative of an expiration time of the attestation watermark; and (ii) cryptographically signing the data object using the cryptographic key, and wherein the specified claim comprises a device identifier of the media player;

attaching the attestation watermark to the advertisement request; and based on encountering the trigger, transmitting the advertisement request having the attached attestation watermark to the computing device, wherein the authenticity of the media player is verifiable by the computing device using the attestation watermark.

11. The media player of claim 10, wherein generating the attestation watermark comprises generating a JavaScript Object Notation (JSON) Web Token including the specified claim using the cryptographic key.

12. The media player of claim 11, wherein a signature of the JWT is verifiable by the computing device using a public key.

13. The media player of claim 12, wherein:

the public key is hosted on a server, and the JWT identifies the public key.

14. The media player of claim 10, wherein the computing device associated with the media provider is a media server.

15. The media player of claim 10, wherein the computing device associated with the media provider is a computing device of an advertisement publisher.

16. The media player of claim 10, wherein generating the attestation watermark comprises:

sending, by the media player, an attestation request to a server that stores the cryptographic key; and receiving, by the media player from the server, the attestation watermark.

\* \* \* \* \*